US012689055B2

(12) United States Patent
Zhang et al.

(10) Patent No.: US 12,689,055 B2
(45) Date of Patent: Jul. 21, 2026

(54) ELECTRODE PLATE, ELECTRODE ASSEMBLY CONTAINING SAME, AND BATTERY

(71) Applicant: Ningde Amperex Technology Limited, Ningde (CN)

(72) Inventors: Xiang Zhang, Ningde (CN); Lin Xia, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 698 days.

(21) Appl. No.: 18/148,572

(22) Filed: Dec. 30, 2022

(65) Prior Publication Data

US 2023/0146401 A1 May 11, 2023

Related U.S. Application Data

(63) Continuation of application No. PCT/CN2020/099584, filed on Jun. 30, 2020.

(51) Int. Cl.
H01M 10/04 (2006.01)
H01M 50/198 (2021.01)
(Continued)

(52) U.S. Cl.
CPC ..... H01M 10/0413 (2013.01); H01M 50/198 (2021.01); H01M 50/502 (2021.01);
(Continued)

(58) Field of Classification Search
CPC ......... H01M 10/0413; H01M 10/0587; H01M 50/186; H01M 50/198; H01M 50/536; Y02E 60/10
(Continued)

(56) References Cited

U.S. PATENT DOCUMENTS

2018/0269458 A1* 9/2018 Oh ...................... H01M 50/124
2019/0252660 A1* 8/2019 Jiao ..................... H01M 50/105
2020/0212408 A1* 7/2020 Zhang ................... H01M 50/46

FOREIGN PATENT DOCUMENTS

CN 201364922 Y * 12/2009
CN 202134604 U * 2/2012
(Continued)

OTHER PUBLICATIONS

International Search Report and Written Opinion issued on Apr. 6, 2021, in corresponding International Application No. PCT/CN2020/099584, 13 pages.

(Continued)

*Primary Examiner* — Brian K Talbot
(74) *Attorney, Agent, or Firm* — Maier & Maier, PLLC

(57) ABSTRACT

An electrode plate including an electrode plate body, a tab, a first adhesive layer, and a second adhesive layer. The tab includes a connecting portion connected to an extending portion. The connecting portion overlaps with and is connected to the electrode plate body. The extending portion protrudes from the connecting portion out of one side of the electrode plate body along a first direction. The first adhesive layer is disposed on the extending portion. The second adhesive layer includes a first part bonded to a surface of the electrode plate body and covering the connecting portion; and a second part formed by extending the first part from a side near the first adhesive layer along the first direction and bonded to the first adhesive layer. In a second direction perpendicular to the first direction, a width of the second part is less than a width of the first part.

11 Claims, 13 Drawing Sheets

(51) Int. Cl.
    *H01M 50/502*     (2021.01)
    *H01M 10/0587*     (2010.01)
    *H01M 50/186*     (2021.01)
    *H01M 50/536*     (2021.01)

(52) U.S. Cl.
    CPC ...... *H01M 10/0587* (2013.01); *H01M 50/186*
        (2021.01); *H01M 50/536* (2021.01); *Y02E*
        *60/10* (2013.01)

(58) Field of Classification Search
    USPC ........................................................ 429/209
    See application file for complete search history.

(56)             References Cited

FOREIGN PATENT DOCUMENTS

| | | | |
|---|---|---|---|
| CN | 202633423 U | | 12/2012 |
| CN | 203119019 U | * | 8/2013 |
| CN | 205609666 U | * | 9/2016 |
| CN | 106784581 A | | 5/2017 |
| CN | 109301149 A | | 2/2019 |
| CN | 110265617 A | | 9/2019 |
| CN | 209709077 U | * | 11/2019 |
| CN | 209786105 U | | 12/2019 |
| CN | 210092210 U | | 2/2020 |
| JP | 2004241149 A | * | 8/2004 |
| JP | 201672175 A | | 5/2016 |
| JP | 2016139586 A | | 8/2016 |

OTHER PUBLICATIONS

Office Action issued on Nov. 23, 2023, in corresponding Chinese Application No. 202080099877.4, 14 pages.
Examination Report issued on Feb. 22, 2023, in corresponding Indian Application No. 202317002969, 5 pages.

* cited by examiner

ELECTRODE PLATE, ELECTRODE ASSEMBLY CONTAINING SAME, AND BATTERY

CROSS REFERENCE TO THE RELATED APPLICATIONS

This application is a continuation under 35 U.S.C. § 120 of international patent application PCT/CN2020/099584 filed on Jun. 30, 2020, the entire contents of which are incorporated herein by reference.

TECHNICAL FIELD

This application relates to the field of batteries, and in particular, to an electrode plate, an electrode assembly containing the electrode plate, and a battery containing the electrode assembly.

BACKGROUND

By virtue of a high energy density, a high working voltage, a long cycle life, environmental friendliness, safety, and other advantages, batteries have been widely used in various electronic products. Therefore, higher requirements are imposed on the safety of the batteries. In a jelly-roll electrode assembly, especially when a tab is disposed near a bend region of the electrode assembly, a protection adhesive layer disposed on an electrode plate is usually bent together with the bending of the electrode plate. Therefore, a sealant on a tab bonded to the protection adhesive layer is pulled and warped, thereby interfering with the sealing of the electrode assembly and even causing risks of electrolyte leakage, and in turn, impairing the safety of the battery.

SUMMARY

In view of the foregoing situation, it is necessary to provide an electrode plate that improves safety.

In addition, it is necessary to provide an electrode assembly containing the electrode plate, and a battery containing the electrode assembly.

An electrode plate according to this application includes an electrode plate body, a tab, a first adhesive layer, and a second adhesive layer. The tab includes a connecting portion and an extending portion connected to the connecting portion. The connecting portion overlaps and is connected to the electrode plate body. The extending portion protrudes from the connecting portion out of one side of the electrode plate body along a first direction. The first adhesive layer is disposed on the extending portion.

The second adhesive layer includes a first part and a second part. The first part is bonded to a surface of the electrode plate body and covers the connecting portion. The second part is formed by extending the first part from a side near the first adhesive layer along the first direction and is bonded to the first adhesive layer. In a second direction perpendicular to the first direction, a width of the second part is less than a width of the first part.

As a technical solution of this application, the second part is directly bonded to the first adhesive layer, or the second part is indirectly bonded to the first adhesive layer through a transition section. The transition section is formed by extending the second part along the first direction.

As a technical solution of this application, along the second direction, a width of the transition section is identical to the width of the first part, or the width of the transition section is identical to the width of the second part.

As a technical solution of this application, in the first direction, the second part at least partly extends beyond the electrode plate body.

As a technical solution of this application, a junction between the first part and the second part is a chamfered, right-angled, acute-angled, or obtuse-angled.

As a technical solution of this application, the tab includes two extending portions. The two extending portions are disposed on two opposite sides of the electrode plate body respectively. The second adhesive layer includes two second parts. The two second parts are disposed on two opposite sides of the first part respectively.

As a technical solution of this application, the second part is disposed in a middle region of the first part, so that the first part extends beyond the second part at both ends along the second direction.

As a technical solution of this application, the second adhesive layer further includes a third part. The third part is formed by extending the second part along the second direction. The third part is bonded to the first adhesive layer. The third part is at least partly disconnected from the first part.

As a technical solution of this application, the third part is connected to the first part. A plurality of gaps are disposed at intervals at a junction between the third part and the first part to form a pre-cut-off structure at the junction.

An electrode assembly according to this application includes a first electrode plate, a second electrode plate, and a separator located between the first electrode plate and the second electrode plate. The first electrode plate, the separator, and the second electrode plate are stacked and then wound to form an electrode assembly. The first electrode plate is the electrode plate described above.

As a technical solution of this application, the electrode assembly includes a bend region. A protruding section of the first part beyond the second part is disposed in the bend region.

As a technical solution of this application, the protruding section of the first part beyond the second part is disposed in the bend region, and the third part is separated from the first part.

A battery according to this application contains the electrode assembly described above.

In the electrode plate, the electrode assembly containing the electrode plate, and the battery containing the electrode assembly according to this application, the width of the second part bonded to the first adhesive layer in the second adhesive layer in the second direction is less than the width of the first part bonded to the electrode plate body in the second adhesive layer in the second direction. This reduces the degree to which the second adhesive layer interferes with the first adhesive layer during winding of the electrode plate, and reduces the risk of warping the first adhesive layer when the second adhesive layer bends together with the bending of the electrode plate body, thereby reducing the impact caused to subsequent sealing of the electrode plate, reducing problems such as poor sealing or even electrolyte leakage, improving the yield rate of the subsequent sealing, the reliability, and safety.

Figure 1:
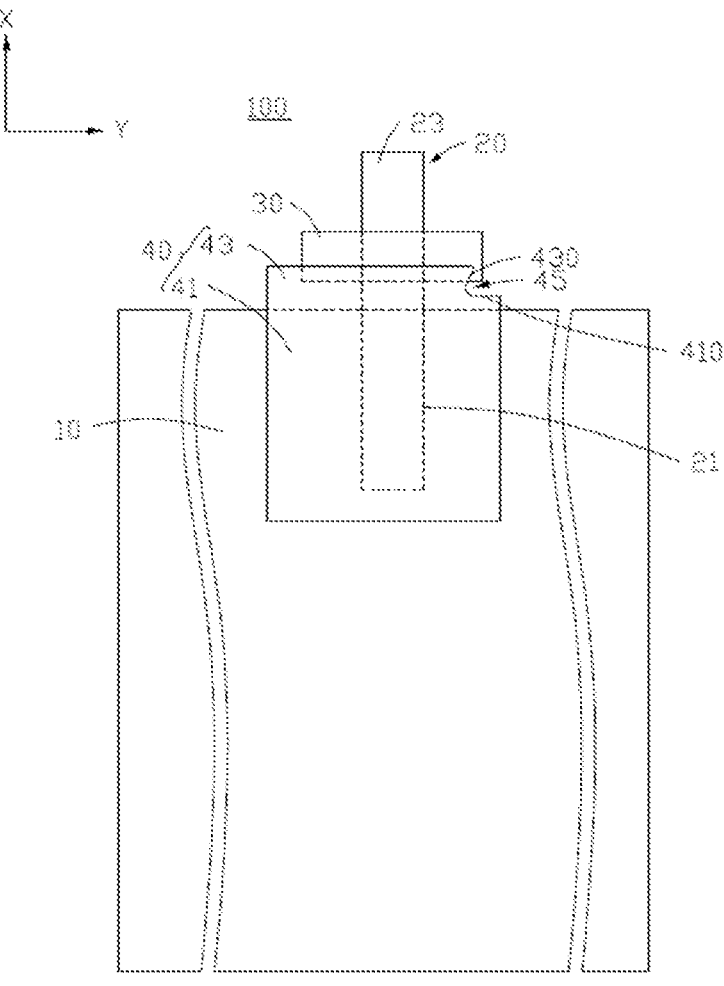
FIG. 1 is a schematic structural diagram of an electrode plate according to an embodiment of this application.

REFERENCE NUMERALS OF MAIN
COMPONENTS

| Electrode plate | 100 |
| --- | --- |
| Electrode plate body | 10 |
| Tab | 20 |
| First adhesive layer | 30 |
| Second adhesive layer | 40 |
| Connecting portion | 21 |
| Extending portion | 23 |
| First direction | X |
| First part | 41 |
| Second part | 43 |
| Second direction | Y |
| End face | 430 |
| Stepped portion | 45 |
| Stepped face | 410 |
| Third part | 47 |
| Gap | 470 |
| Electrode assembly | 600 |
| First electrode plate | 601 |
| Second electrode plate | 603 |
| Separator | 605 |
| Bend region | 61 |
| Flat region | 63 |

This application is further described below with reference to the following specific embodiments and the foregoing drawings.

DETAILED DESCRIPTION

The following describes the technical solutions in the embodiments of this application clearly and thoroughly with reference to the drawings herein. Evidently, the described embodiments are merely a part of but not all of the embodiments of this application.

Unless otherwise defined, all technical and scientific terms used herein have the same meanings as what is normally ascribed to such terms by a person skilled in the technical field of this application. The terms used in the specification of this application are merely intended to describe specific embodiments but not to limit this application.

The following describes some embodiments of this application in detail with reference to drawings. To the extent that no conflict occurs, the following embodiments and the features in the embodiments may be combined with each other.

Referring to FIG. 1, according to an embodiment of this application, an electrode plate 100 includes an electrode plate body 10, a tab 20, a first adhesive layer 30, and a second adhesive layer 40. The tab 20 includes a connecting portion 21 and an extending portion 23 connected to the connecting portion 21. The connecting portion 21 overlaps and is connected to the electrode plate body 10. The extending portion 23 protrudes from the connecting portion 21 out of one side of the electrode plate body 10 along a first direction X, and is configured to be electrically connected to other electronic components. The first adhesive layer 30 is disposed on the extending portion 23. The second adhesive layer 40 includes a first part 41 and a second part 43. The first part 41 is bonded to a surface of the electrode plate body 10 and covers the connecting portion 21. The second part 43 is formed by extending the first part 41 from a side near the first adhesive layer 30 along the first direction X and is bonded to the first adhesive layer 30. In a second direction Y perpendicular to the first direction X, a width of the second part 43 is less than a width of the first part 41. The first adhesive layer 30 is thermally melted and thoroughly bonded to a sealing film when the electrode plate 100 is subsequently sealed in the sealing film to form a battery, so as to implement sealing at the tab 20. When covering the connecting portion 21, the second adhesive layer 40 can cover burrs at a weld between the connecting portion 21 and the electrode plate body 10, thereby reducing the risk that the burrs pierce the sealing film subsequently and other risks such as a short circuit caused by the burrs. In addition, during formation of an electrode assembly or a battery, the second adhesive layer 40 can further reduce the risk of a contact and short circuit between the positive electrode plate and the negative electrode plate. The width of the second part 43 bonded to the first adhesive layer 30 in the second adhesive layer 40 in the second direction Y is less than the width of the first part 41 bonded to the electrode plate body 10 in the second adhesive layer 40 in the second direction Y. This reduces the degree to which the second adhesive layer 40 interferes with the first adhesive layer 30 during winding of the electrode plate 100, and reduces the risk of warping the first adhesive layer 30 when the second adhesive layer 40 bends together with the bending of the electrode plate body 10, thereby reducing the impact caused to subsequent sealing of the electrode plate, reducing problems such as poor sealing or even electrolyte leakage, improving the yield rate of the subsequent sealing, the reliability, and safety.

The first adhesive layer 30 may be, but without being limited to, green adhesive or hot melt adhesive, and may be other adhesive materials used as a sealant. The thickness of the first adhesive layer 30 is not limited herein, and may be adjusted as required.

The second adhesive layer 40 may be a bonding layer or adhesive tape. The adhesive tape includes a substrate layer and a bonding layer disposed on the substrate layer. The adhesive tape may be single-sided tape or double-sided tape.

Preferably, the thickness of the second adhesive layer 40 is enough to prevent the burrs at the weld between the connecting portion 21 and the electrode plate body 10 from piercing the second adhesive layer 40.

Figure 2:
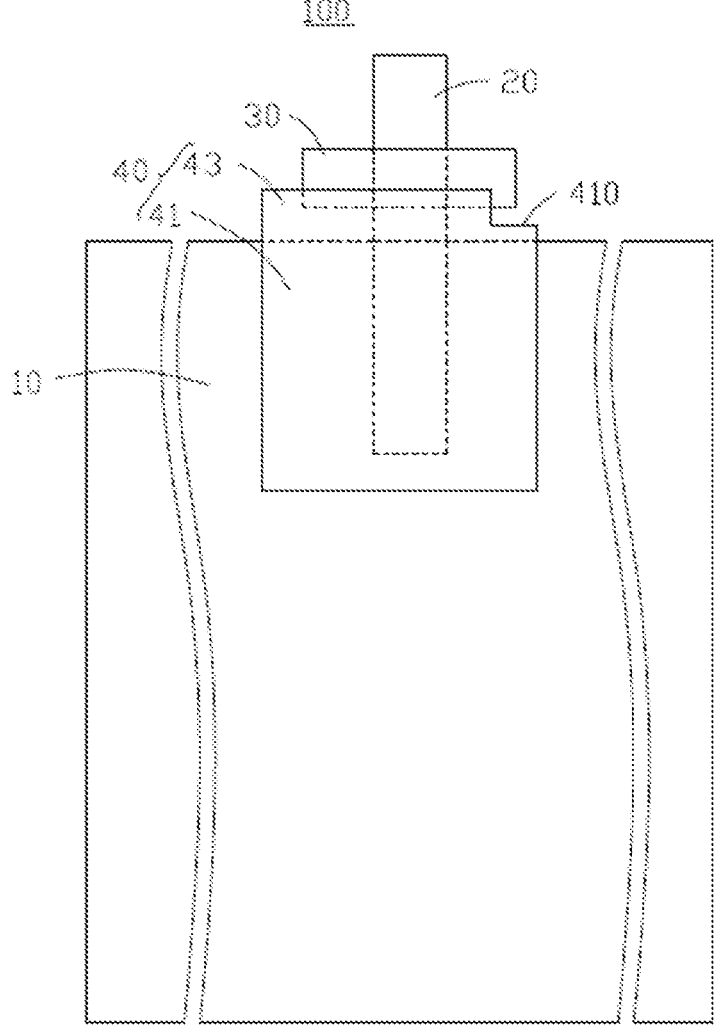
FIG. 2 is a schematic structural diagram of an electrode plate according to an embodiment of this application.
Figure 3:
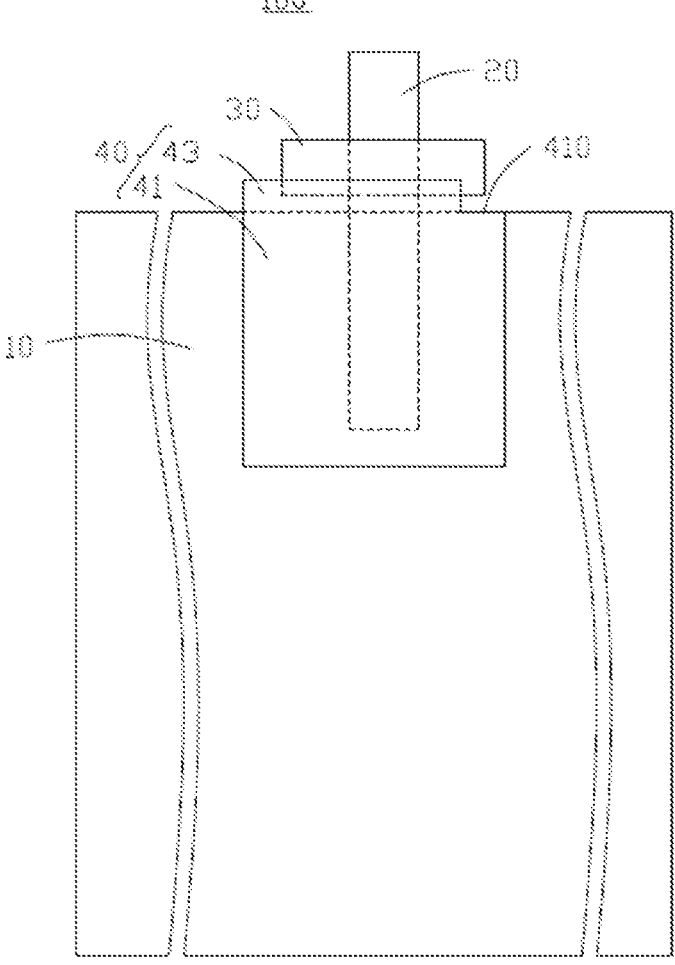
FIG. 3 is a schematic structural diagram of an electrode plate according to an embodiment of this application.
Figure 4:
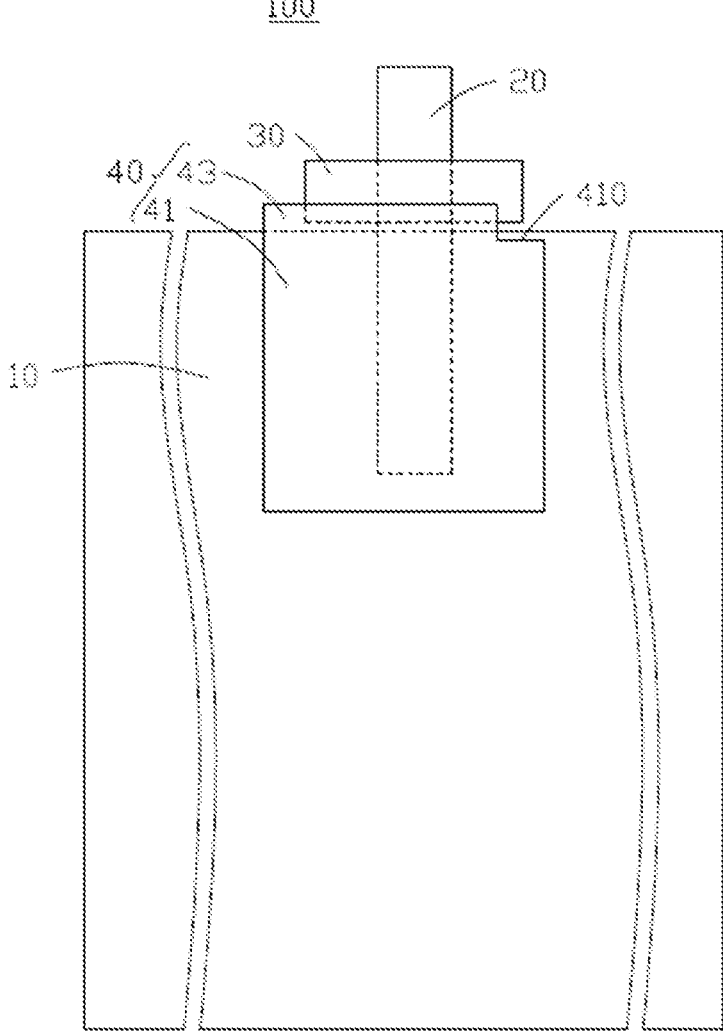
FIG. 4 is a schematic structural diagram of an electrode plate according to an embodiment of this application.

Referring to FIG. 2, FIG. 3, and FIG. 4, the first part 41 may extend beyond an edge of the electrode plate body 10 (as shown in FIG. 2) and overlap the region (as shown in FIG. 3) of the electrode plate body 10 except the edge, or may be aligned with the edge of the electrode plate body 10 (as shown in FIG. 4). Preferably, the first part 41 is aligned with the edge of the electrode plate body 10 (as shown in FIG. 4) or extends beyond the edge of the electrode plate body 10 (as shown in FIG. 2), thereby further reducing the degree to which the first part 41 interferes with the first adhesive layer 30 due to bending of the electrode plate body. More preferably, the first part 41 extends beyond the edge of the electrode plate body 10 (as shown in FIG. 2), thereby further reducing the risk of a contact and short circuit between positive electrode plate and the negative electrode plate while reducing the degree to which the second adhesive layer 40 interferes with the first adhesive layer 30.

An end face 430 of the second part 43 may be at a right angle (as shown in FIG. 2), acute angle, or obtuse angle to the first part 41.

Figure 5:
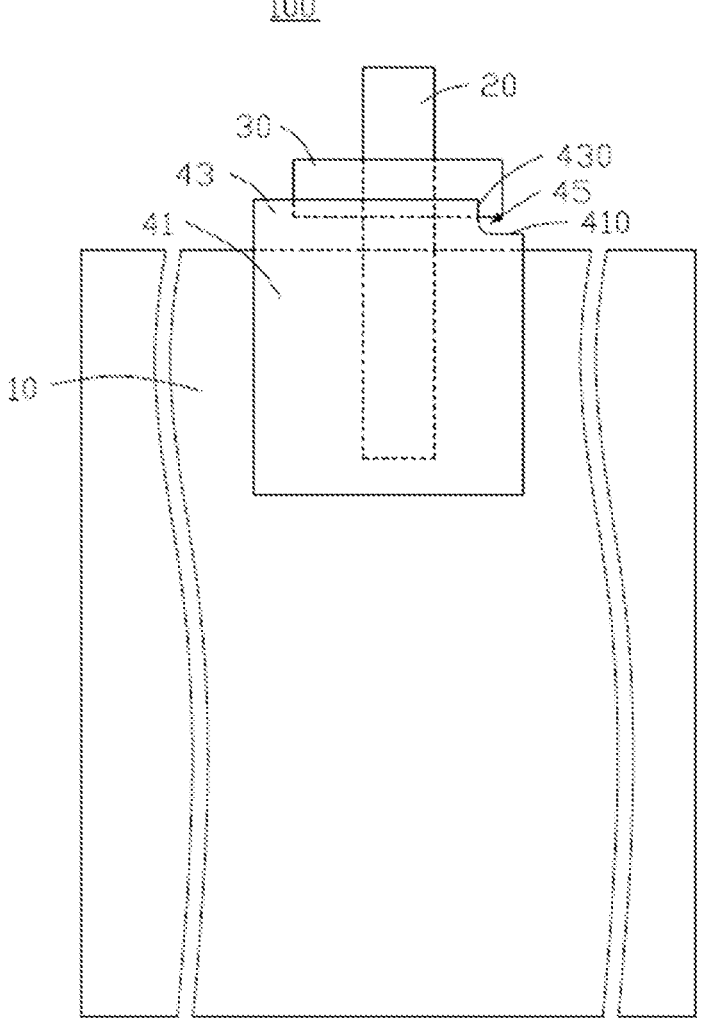
FIG. 5 is a schematic structural diagram of an electrode plate according to an embodiment of this application.

In some embodiments, the junction between the first part 41 and the second part 43, that is, the junction between the first part 41 and the end face 430 may be chamfered or rounded. Preferably, referring to FIG. 5, the junction between the first part 41 and the end face 430 is rounded, so as to reduce stress concentration at the junction between the first part 41 and the end face 430 during subsequent winding of the electrode plate 100.

Figure 6:
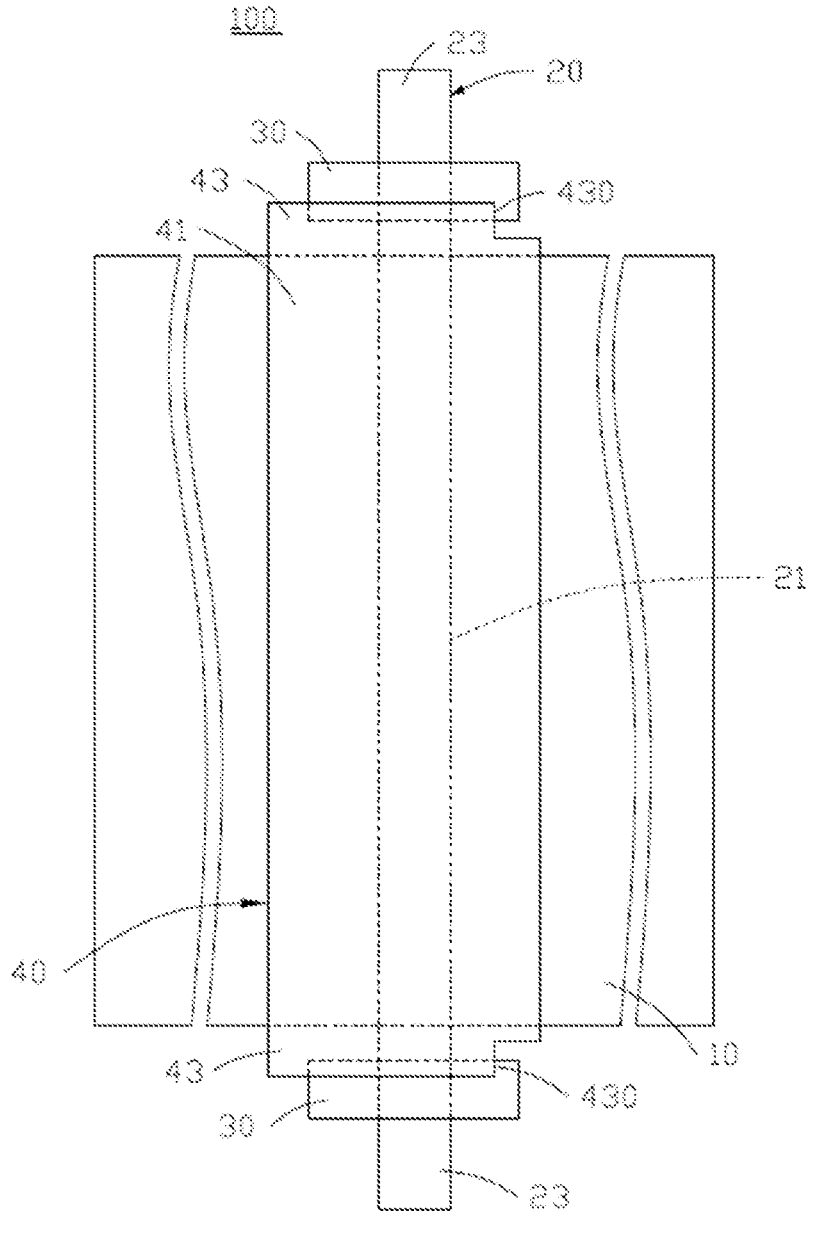
FIG. 6 is a schematic structural diagram of an electrode plate according to an embodiment of this application.

In some embodiments, referring to FIG. 6, the tab 20 may include two extending portions 23. The two extending portions 23 are disposed on two opposite sides of the electrode plate body 10 respectively. According to an embodiment of this application, the two extending portions 23 may extend to the same connecting portion 21. According to another embodiment of this application, the two extending portions 23 may extend to the two connecting portions 21 respectively. The first adhesive layer 30 is disposed on each extending portion 23.

The second adhesive layer 40 correspondingly includes two second parts 43. The two second parts 43 are disposed on two opposite sides of the first part 41 respectively, and are bonded to the first adhesive layers 30 on adjacent extending portions 23 respectively. In the second direction Y, the width of each second part 43 is less than the width of the first part 41. In this embodiment, the end faces 430 of the two second parts 43 are flush with each other in the second direction Y. In some embodiments, the end faces 430 of the two second parts 43 may be not flush with each other in the second direction Y.

Figure 7:
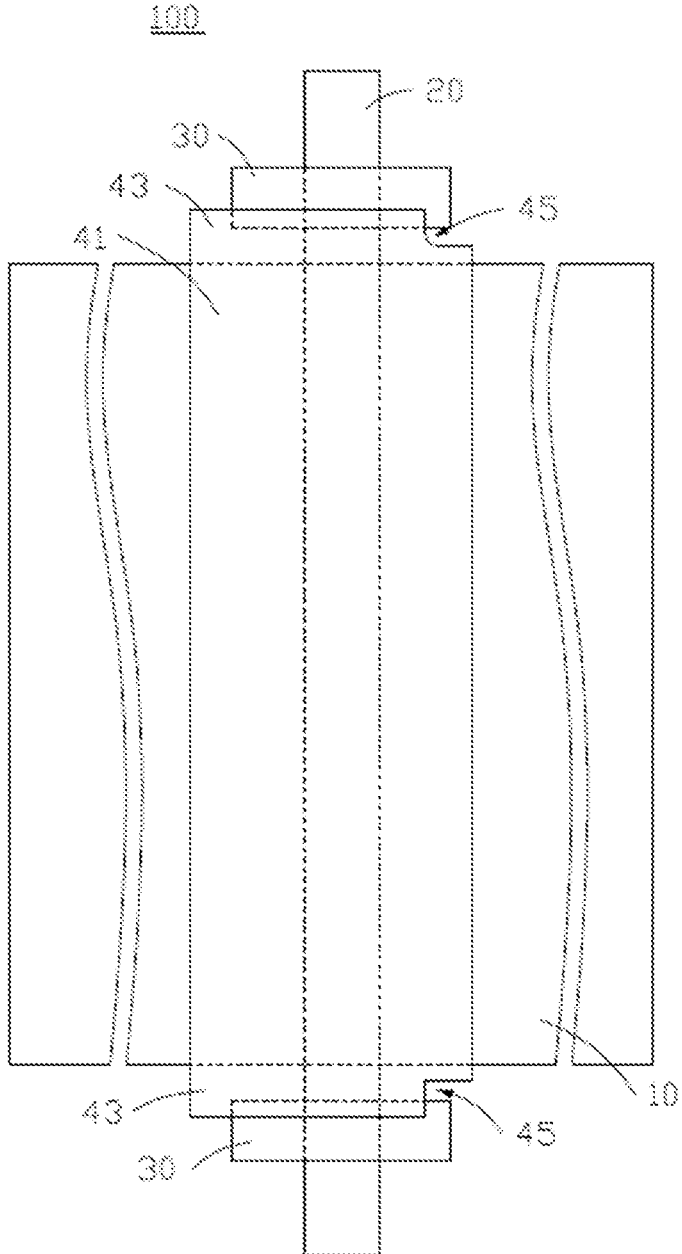
FIG. 7 is a schematic structural diagram of an electrode plate according to an embodiment of this application.

According to an embodiment of this application, a structure of a stepped portion 45 may be formed between each of the two second parts 43 and the first part 41, and the two stepped portions are of the same structure. In some embodiments, a structure of a stepped portion 45 may be formed between each of the two second parts 43 and the first part 41, and the two stepped portions are of different structures, as shown in FIG. 7.

Figure 8:
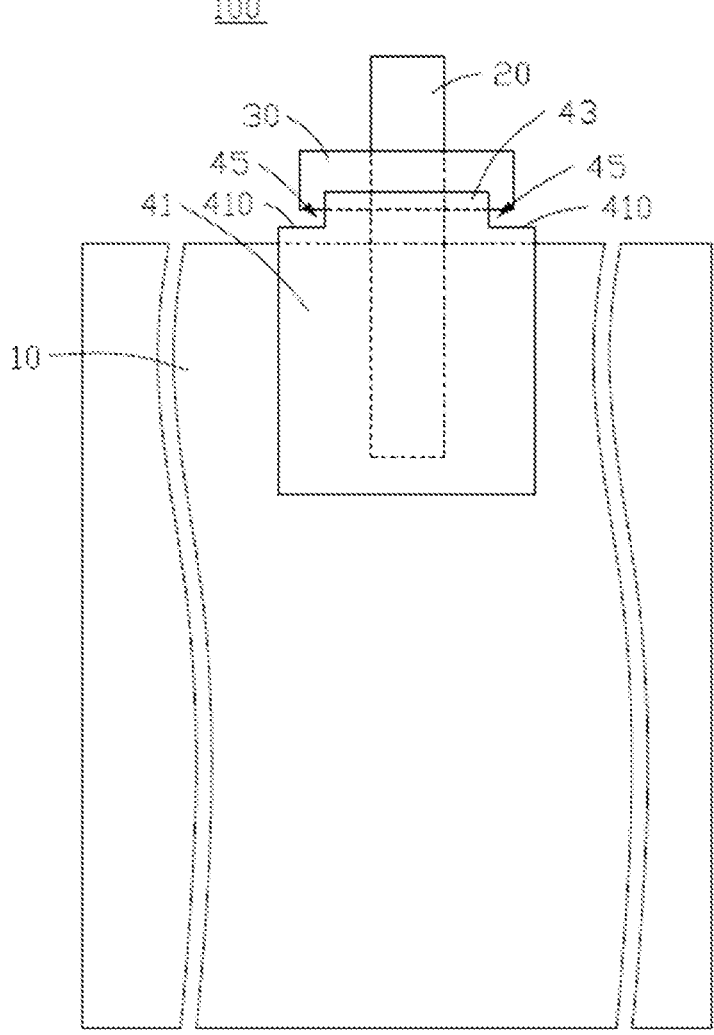
FIG. 8 is a schematic structural diagram of an electrode plate according to an embodiment of this application.

Referring to FIG. 1, one stepped portion 45 exists between the first part 41 and each of the second parts 43. In some embodiments, referring to FIG. 8, two stepped portions 45 may exist between the first part 41 and each of the second parts 43. The two stepped portions 45 are located on two sides of the second part 43 respectively along the second direction Y, thereby facilitating the winding of the electrode plate 100. The widths of stepped faces 410 of the two stepped portions 45 in the second direction Y may be the same or different.

Figure 9:
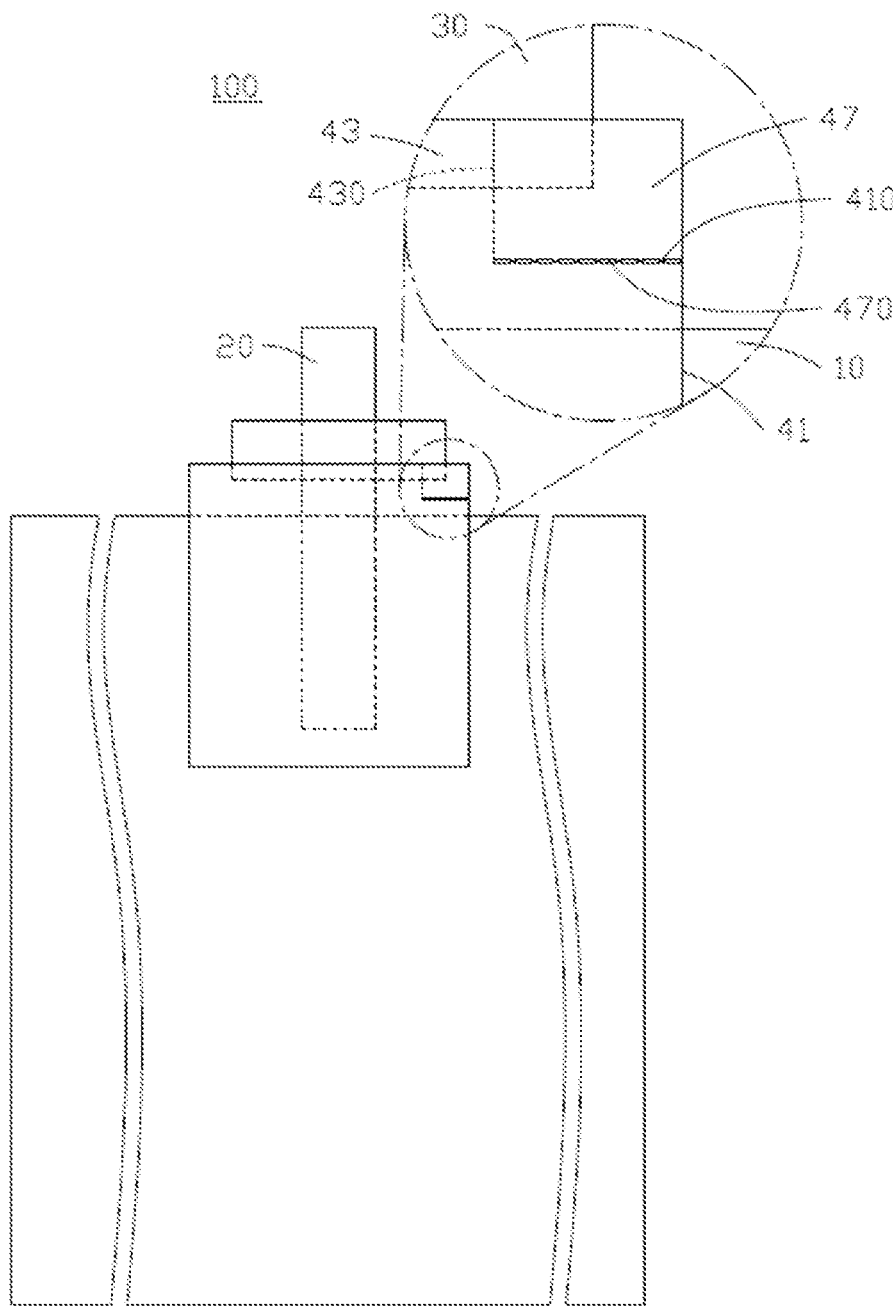
FIG. 9 is a schematic structural diagram of an electrode plate according to an embodiment of this application.
Figure 10:
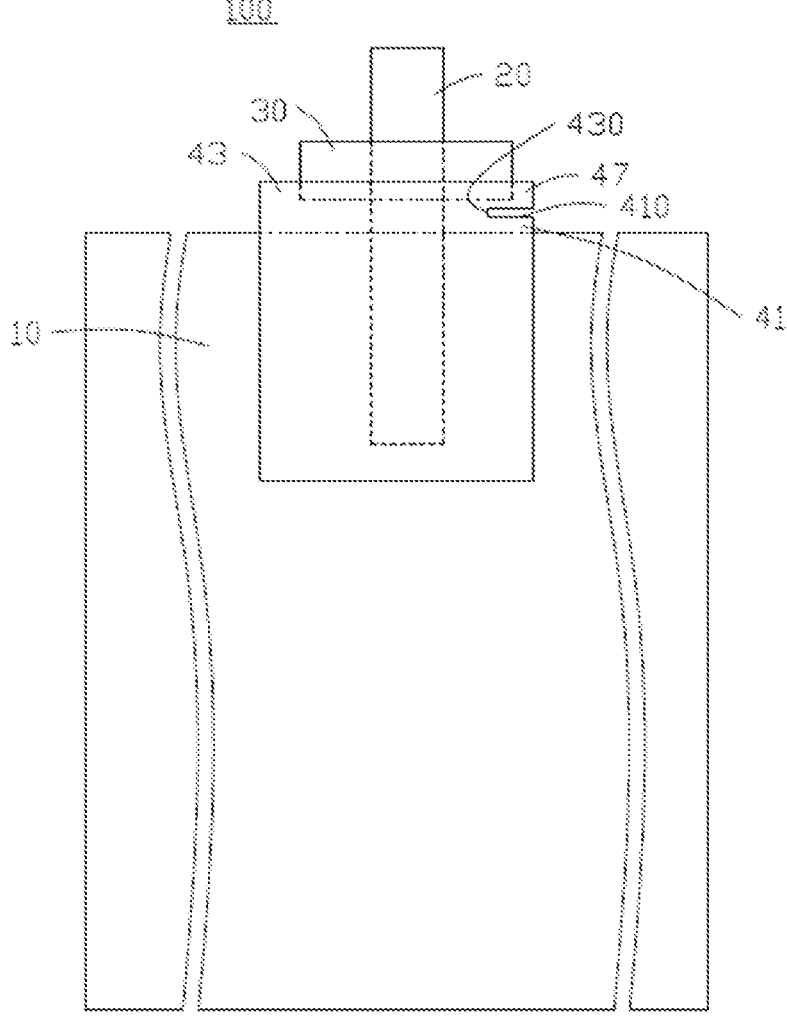
FIG. 10 is a schematic structural diagram of an electrode plate according to an embodiment of this application.

In some embodiments, referring to FIG. 9 and FIG. 10, the second adhesive layer 40 may further include a third part 47. The third part 47 is formed by extending the second part from the end face 430 along the second direction Y. The third part 47 is bonded to the first adhesive layer 30, and the third part 47 is at least partly disconnected from the stepped face 410. The third part 47 can further reduce the risk of short circuits.

As shown in 9, the third part 47 is connected to the first part 41. A plurality of gaps 470 are disposed at intervals at a junction between the third part 47 and the first part 41 to form a pre-cut-off structure at the junction. During winding of the electrode plate 100, the third part 47 is separated from the first part 41 under the action of a force.

Each gap 470 may be, but without being limited to, a cross section, a circular hole, a bar hole, a square hole, a prismatic hole, or another regular or irregular hole. The number of the gaps 470 is set as required. The spacing between any two adjacent gaps 470 may also be set as required, details of which are omitted here.

As shown in FIG. 10, the third part 47 is fully disconnected, that is, separated, from the first part 41, thereby preventing the first part 41 from directly acting on the third part 47 and reducing the degree of interfering with the first adhesive layer 30.

In some embodiments, when the second adhesive layer 40 includes at least two stepped portions 45, the third part 47 is disposed on at least one of the end faces 430. When the second adhesive layer 40 includes at least two third parts 47, the structures between any two of the third parts 47 and an adjacent first part 41 may be identical or different.

Figure 11:
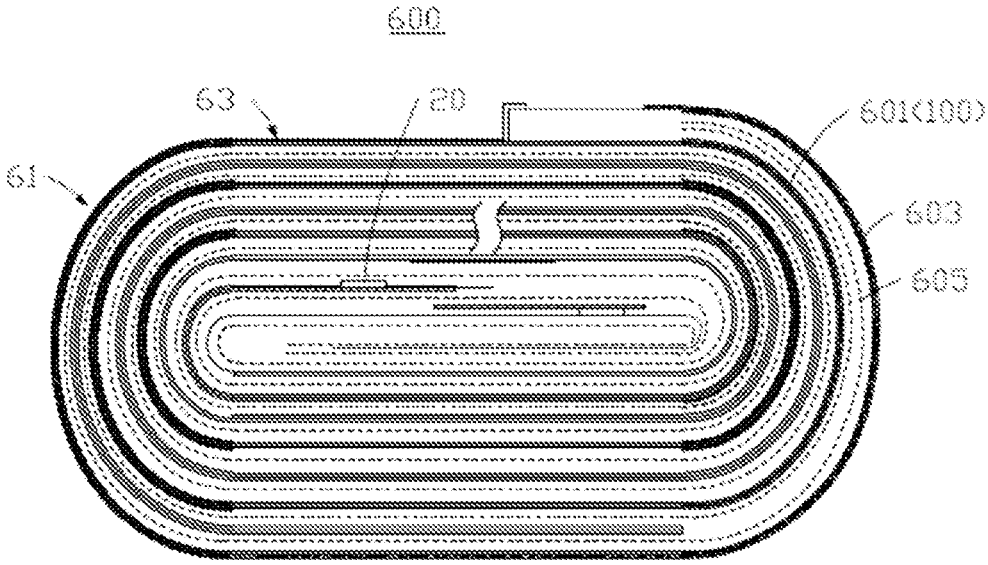
FIG. 11 is a schematic structural diagram of an electrode assembly according to an embodiment of this application.
Figure 12:
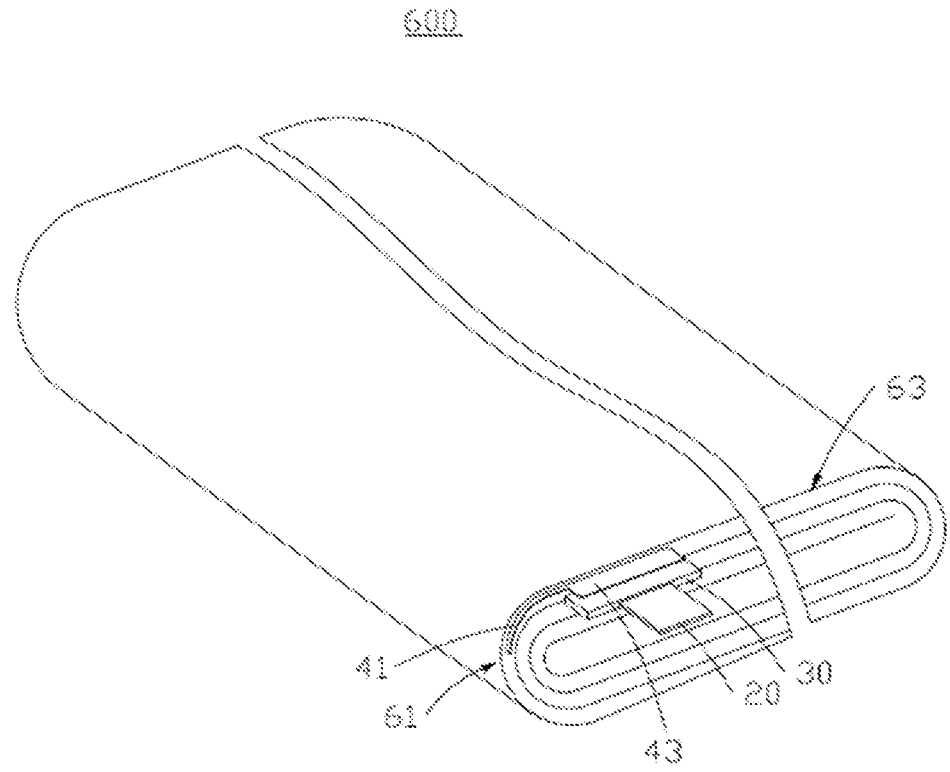
FIG. 12 is a schematic structural diagram of an electrode assembly according to an embodiment of this application.

The electrode plate 100 is applied to an electrode assembly. Referring to FIG. 11 and FIG. 12, according to an embodiment of this application, the electrode assembly 600 includes a first electrode plate 601, a second electrode plate 603, and a separator 605 located between the first electrode plate 601 and the second electrode plate 603. The first electrode plate 601, the separator 605, and the second electrode plate 603 are stacked and then wound to form the electrode assembly 600.

In this embodiment, the electrode plate 100 serves as the first electrode plate 601.

The electrode assembly 600 includes a bend region 61 and a flat region 63 connected to the bend region 61. The tab 20 is disposed in the flat region 63.

A region corresponding to the second part 43 in the first part 41 is disposed in the flat region 63. A protruding section of the first part 41 beyond the second part 43 is located on a side that is of the second part 43 and that is close to the bend region 61.

In some embodiments, referring to FIG. 12, at least a part of the protruding section of the first part 41 beyond the second part 43 may be disposed in the bend region 61, as long as it is ensured that the region corresponding to the second part 43 in the first part 41 is disposed in the flat region 63, thereby reducing the degree to which the second adhesive layer 40 interferes with the first adhesive layer 30 during winding of the electrode plate 100.

Figure 13:
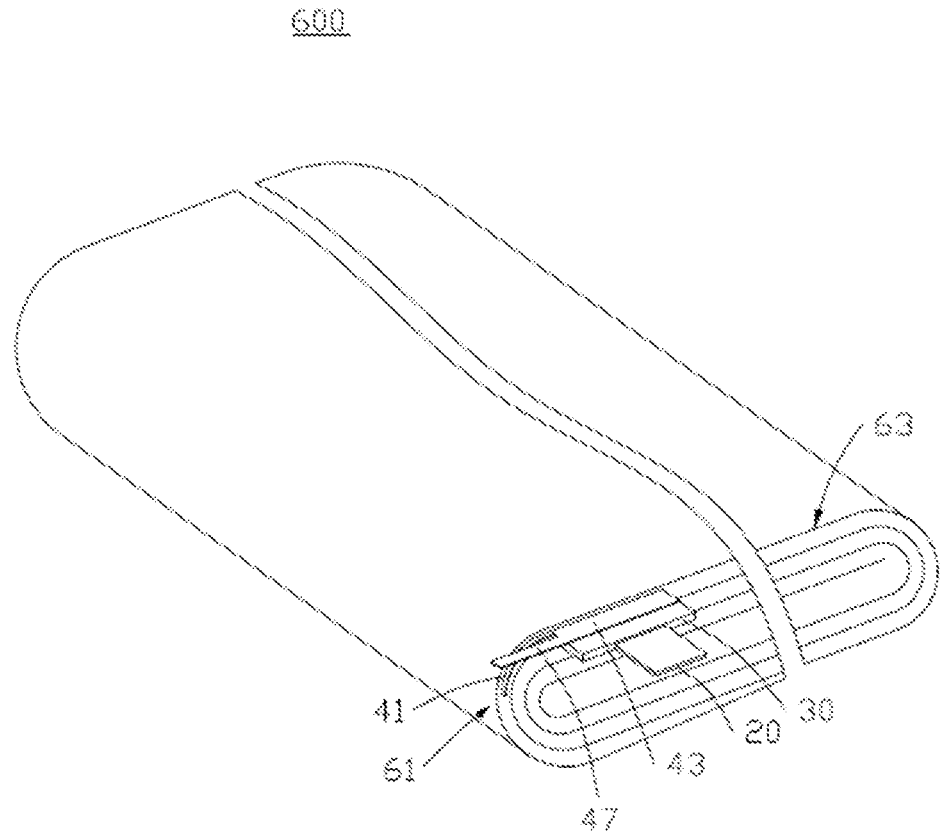
FIG. 13 is a schematic structural diagram of an electrode assembly according to an embodiment of this application.

In some embodiments, referring to FIG. 13, when the electrode plate 100 applied to the electrode assembly 600 further includes the third part 47, if at least a part of the protruding section of the first part 41 beyond the second part 43 is disposed in the bend region 61, the third part 47 is separated from the part of the protruding section of the first part 41 beyond the second part 43, where that part is disposed in the bend region 61.

In some embodiments, the structures of the first adhesive layer 30 and the second adhesive layer 40 in the electrode plate 100 as well as the positional relationship between each adhesive layer and the tab or the electrode plate body is also applicable to the second electrode plate 603.

The electrode assembly 600 is applied to an electrochemical device (not shown in the drawing). The electrochemical device may be, but without being limited to, a battery.

In the electrode plate, the electrode assembly containing the electrode plate, and the battery containing the electrode assembly according to this application, the width of the second part 43 bonded to the first adhesive layer 30 in the second adhesive layer 40 in the second direction Y is less than the width of the first part 41 bonded to the electrode plate body 10 in the second adhesive layer 40 in the second direction Y. This reduces the degree to which the second adhesive layer 40 interferes with the first adhesive layer 30 during winding of the electrode plate 100, and reduces the risk of warping the first adhesive layer 30 when the second adhesive layer 40 bends together with the bending of the electrode plate body 10, thereby reducing the impact caused to subsequent sealing of the electrode plate, reducing problems such as poor sealing or even electrolyte leakage, improving the yield rate of the subsequent sealing, the reliability, and safety.

Various modifications and variations may be made by a person of ordinary skill in the art based on the technical conception hereof, and all such modifications and variations still fall within the protection scope of this application.

What is claimed is:

1. An electrode assembly, comprising a first electrode plate, a second electrode plate, and a separator located between the first electrode plate and the second electrode plate;

wherein the first electrode plate, the separator, and the second electrode plate are stacked and wound to form an electrode assembly, wherein the first electrode plate comprises:

an electrode plate body, a tab, a first adhesive layer, and a second adhesive layer; wherein the tab comprises a connecting portion and an extending portion connected to the connecting portion, the connecting portion overlaps with the electrode plate body and is connected to the electrode plate body, the extending portion protrudes from the connecting portion out of one side of the electrode plate body along a first direction, and the first adhesive layer is disposed on the extending portion; wherein, the second adhesive layer comprises a first part and a second part, the first part is bonded to a surface of the electrode plate body and covers the connecting portion, the second part is formed by extending the first part from a side of the first part disposed towards the first adhesive layer along the first direction and is bonded to the first adhesive layer; and, in a second direction approximately perpendicular to the first direction, a width of the second part is less than a width of the first part;

wherein the electrode assembly comprises a bend region, and a protruding section of the first part extending beyond the second part in the second direction is disposed in the bend region.

2. The electrode assembly according to claim 1, wherein the second part is directly bonded to the first adhesive layer, or the second part is indirectly bonded to the first adhesive layer through a transition section, wherein the transition section is formed by extending the second part along the first direction.

3. The electrode assembly according to claim 2, wherein along the second direction, a width of the transition section is identical to the width of the first part, or the width of the transition section is identical to the width of the second part.

4. The electrode assembly according to claim 1, wherein in the first direction, the second part at least partly extends beyond the electrode plate body.

5. The electrode assembly according to claim 1, wherein a junction between the first part and the second part is chamfered.

6. The electrode assembly according to claim 1, wherein the tab comprises two extending portions, the two extending portions are disposed on two opposite sides of the electrode plate body respectively, the second adhesive layer comprises two second parts, and the two second parts are disposed on two opposite sides of the first part respectively.

7. The electrode assembly according to claim 1, wherein the second adhesive layer further comprises a third part, the third part is formed by extending the second part along the second direction, the third part is bonded to the first adhesive layer.

8. The electrode assembly according to claim 7, wherein the third part is connected to the first part, and a plurality of gaps are disposed at intervals at a junction between the third part and the first part to form a pre-cut-off structure at the junction.

9. The electrode assembly according to claim 1, wherein the second part is disposed in a middle region of the first part, so that the first part extends beyond the second part at both ends along the second direction.

10. The electrode assembly according to claim 8, wherein the third part is separated from the first part.

11. A battery, wherein the battery comprises the electrode assembly according to claim 1.

* * * * *